US006238765B1

(12) United States Patent
Bailey et al.

(10) Patent No.: US 6,238,765 B1
(45) Date of Patent: May 29, 2001

(54) VEHICLE FLOOR MAT

(75) Inventors: Bob Bailey, Charlton; Jeffrey L. Stucker, Queensbury, both of NY (US)

(73) Assignee: Racemark International, Inc., Malta, NY (US)

( * ) Notice: Subject to any disclaimer, the term of this patent is extended or adjusted under 35 U.S.C. 154(b) by 0 days.

(21) Appl. No.: 09/333,340

(22) Filed: Jun. 15, 1999

(51) Int. Cl.$^7$ .................................. B32B 3/06; B60N 3/04
(52) U.S. Cl. ............................ 428/95; 428/99; 428/120; 24/442; 24/446; 24/449
(58) Field of Search ............................ 428/95, 99, 100, 428/120; 16/4, 6; 24/446, 449, 442

(56) References Cited

U.S. PATENT DOCUMENTS

| | | | |
|---|---|---|---|
| D. 390,099 | 2/1998 | Bailey et al. | D8/387 |
| 4,012,544 | 3/1977 | Richards | 428/95 |
| 4,340,633 | 7/1982 | Robbins, Jr. | 428/99 |
| 4,403,895 | 9/1983 | Caldwell et al. | 411/378 |
| 4,425,690 | 1/1984 | Fraser et al. | 24/351 |
| 4,692,364 | 9/1987 | Altus | 428/85 |
| 4,705,441 | 11/1987 | Arnold | 411/188 |
| 4,748,063 | 5/1988 | Reuben | 428/78 |
| 4,756,653 | 7/1988 | Berger | 411/411 |
| 4,762,453 | 8/1988 | DeCaro | 411/383 |
| 4,829,627 | 5/1989 | Altus et al. | 16/4 |
| 4,846,815 * | 7/1989 | Scripps | 24/442 |
| 4,921,742 | 5/1990 | Altus | 428/81 |
| 4,998,319 | 3/1991 | Ford | 16/8 |
| 5,034,258 | 7/1991 | Grace | 428/78 |
| 5,154,961 | 10/1992 | Reuben | 428/82 |
| 5,171,619 | 12/1992 | Reuben | 428/95 |
| 5,183,359 | 2/1993 | Barth | 411/188 |
| 5,316,817 * | 5/1994 | Timperley | 428/100 |
| 5,362,544 | 11/1994 | Reuben | 428/82 |
| 5,384,939 | 1/1995 | Weber | 24/306 |
| 5,775,859 | 7/1998 | Anscher | 411/38 |
| 5,776,583 | 7/1998 | Peyton | 428/120 |
| 5,891,546 | 4/1999 | Sherman | 428/88 |
| 5,979,024 * | 11/1999 | Renwick | 24/442 |

FOREIGN PATENT DOCUMENTS

| | | |
|---|---|---|
| 85 34 504 U | 2/1986 | (DE) . |
| 0 311 736 | 4/1989 | (EP) . |
| 0 829 391 | 3/1998 | (EP) . |
| 2 677 590 | 12/1992 | (FR) . |
| 2 282 965 | 4/1995 | (GB) . |
| 7051216 | 2/1995 | (JP) . |
| WO 97/06029 | 2/1997 | (WO) . |

* cited by examiner

Primary Examiner—Alexander S. Thomas
(74) Attorney, Agent, or Firm—Heslin & Rothenberg, P.C.

(57) ABSTRACT

A floor mat is disclosed which is releasably attachable to loop-pile fibers of a carpet of the carpeted floor board of a vehicle. The floor mat includes a generally planar member having a top surface, a carpet material attached and/or bonded to the top surface, a plurality of integrally formed, spaced-apart, downwardly-depending nibs, and a plurality of integrally formed, spaced-apart, downwardly-depending, carpet-engaging members interlockably engageable with the loop-pile fibers of the carpeted floor board. The planar member, and thus, the integrally formed carpet-engaging members are desirably formed from a heat curable, elastomeric or rubber-like material so that the plurality of carpet-engaging members is disengageable from the loop-pile fibers of the carpeted floor board generally without damaging the loop-pile fibers of the carpeted floor board. Also disclosed are a mold and a method for forming such a floor mat.

39 Claims, 3 Drawing Sheets

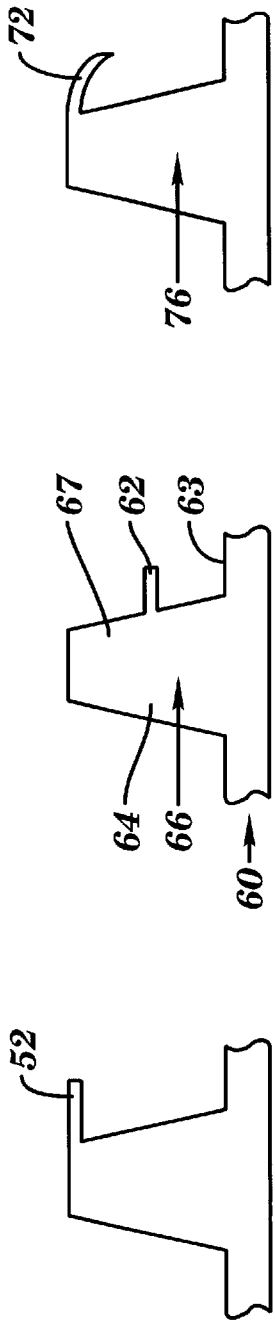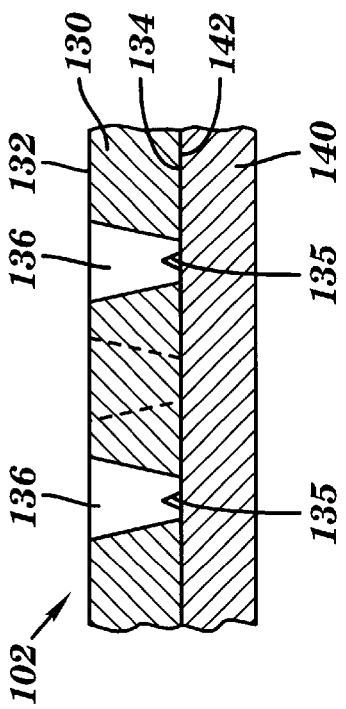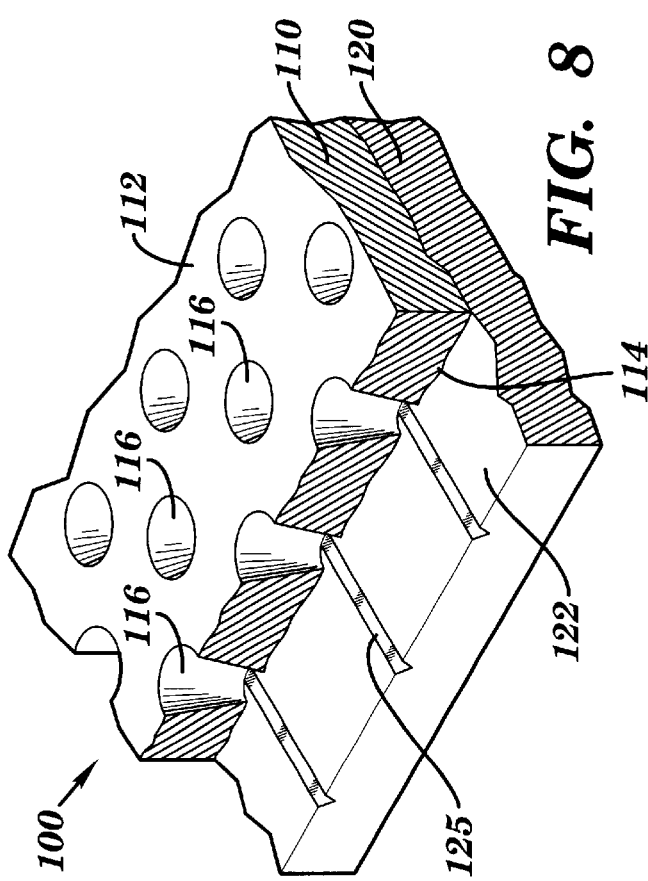

VEHICLE FLOOR MAT

TECHNICAL FIELD

The present invention relates to vehicle floor mats, and more particularly to vehicle floor mats which releasably attach to carpeted floor boards of a vehicle.

BACKGROUND INFORMATION

It is often desirable to protect factory installed carpeting in a vehicle, and particularly carpeted floor boards from wear and tear, with floor mats. Such floor mats typically have an upper surface covered with a carpet material.

A familiar and long-standing problem associated with the use of such floor mats is that the floor mats have a tendency to move or shift (e.g., due to the action of the driver's feet on the floor mat during normal use and operation of a vehicle) and interfere with the operation of the brake and/or accelerator pedals.

Numerous attempts have been made to address the problem of movement of a floor mat relative to the carpeted floor board. One attempt is to provide fasteners or retainers which extend through holes in the floor mat, the carpet overlaying the floor board, and/or the floor board to attach the floor mat to the carpeted floor board. While suitable for maintaining the floor mat in a fixed position relative to the floor board, a drawback with the use of such fasteners is that the floor mat is not easily and quickly removed, cleaned, and reinstalled.

Another attempt is to provide disks or strips of VELCRO® brand (i.e., hook and loop-type) fasteners, for example, a first disk or strip having mechanically interlocking members (e.g., loops) secured to the back of the floor mat and a second disk or strip having mechanically interlocking members (e.g., hooks) secured to the carpeted floor board in registration with the first disk or strip. Drawbacks with this attempt are that only a small portion, e.g., the corners, of the bottom of the floor mat is secured to the carpeted floor board, and the floor mat must be properly aligned relative to the floor board for the portions of the VELCRO® brand fasteners to fully engage each other.

It has also been proposed to just attach, e.g., adhesively attach, strips of the hook portion of the VELCRO® brand fastener to the back or bottom of the floor mat for use on carpeted floor boards having loop-pile fibers so that the hooks engage the loop-pile fibers of the carpeted floor board to hold the floor mat in place. A drawback with this approach is that the hooks of the VELCRO® brand fastener are formed from a rigid material which damages the carpeted floor board when the floor mat is removed, i.e., the hooks pull the loop-pile fibers of the carpet material and cause the fibers to break and extend above the remaining intact loop-pile fibers. Furthermore, in manufacturing such a floor mat, separate operations or steps are required to adhesively attach each of the plurality of strips to the back of the floor mat.

Still another attempt is to provide an anti-skid foam backing to the floor mat to increase the resistance to motion between the floor mat and the carpeted floor board.

Still yet another attempt is to provide downwardly-depending conical or frustoconical projections or nibs extending from the bottom surface of the floor mat. A related attempt also includes providing a separate retainer member, which is positionable between the bottom surface of a floor mat and the top surface of the carpeted floor board, and includes upwardly-extending nibs for engaging the bottom of the floor mat and downwardly-depending nibs which engage the top surface of the carpeted floor board.

A floor mat with a plurality of nibs is typically molded using a first die having a plurality of apertures therethrough and a second die which provides a backing to the first die to form a flat lowermost bottom surface of the nibs. In production of floor mats having nibs, a heat formable/curable moldable material is forced into the apertures to form the nibs. The pressure used to force the moldable material is selected so that the moldable material is forced into the apertures while avoiding the occurrence of flashing, i.e., a fin or excess material along the mold joint line between the mating faces of the first and second dies. In addition, reliefs have been provided along the surface of the second die, some of which may extend below some of the apertures, to allow air to escape when forming the nibs. In producing finished floor mats having nibs, flashing and/or excess material entering the reliefs while infrequently occurring is unwanted and intentionally avoided to produce floor mats having cleanly formed nibs.

While floor mats having a foam backing or nibs increase the resistance to sideways motion and readily allow the floor mat to be removed for cleaning (e.g., providing no resistance to the nibs being vertically lifted from the carpeted floor board), such floor mats over time still move or shift during normal use and operation of a vehicle.

Therefore, there is a need for a floor mat which releasably attaches to a loop-pile carpeted floor board to inhibit movement of a floor mat relative to the carpeted floor board and which can be readily repeatedly removed for cleaning thereof while not damaging the underlying carpeted floor board.

SUMMARY OF THE INVENTION

The above-mentioned drawbacks are overcome by the present invention which provides a vehicle floor mat releasably attachable to loop-pile fibers of a carpeted floor board in which the floor mat includes a generally planar member having a plurality of integrally formed, spaced-apart, downwardly-depending, carpet-engaging members interlockably engageable with the loop-pile fibers of the carpeted floor board.

In one aspect of the present invention, the plurality of carpet-engaging members is desirably configured and fabricated from an elastic material so that the plurality of carpet-engaging members are disengeable from the loop-pile fibers of the carpeted floor board generally without breaking the loop-pile fibers of the carpeted floor board. For example, the generally planar member and integrally formed carpet-engaging members may comprise a rubber-like material, a thermoplastic elastomer, or a thermoplastic olefin elastomer.

In another aspect of the present invention, the planar member includes a bottom surface and the plurality of carpet-engaging members extend from and are distributed generally evenly spaced-apart over substantially the entire area of the bottom surface. Each of the plurality of carpet-engaging members may include a downwardly-depending projection having one or more outwardly-extending elongated portions. Desirably, the planar member has a top surface and a carpet material attached thereto.

In another aspect of the present invention, the planar member further comprises a plurality of integrally formed, spaced-apart, downwardly-depending nibs. Desirably, the ratio of carpet-engaging members to nibs is between about one to about four carpet-engaging members per every ten nibs.

In still another aspect of the present invention, a mold is provided for forming a vehicle floor mat having a plurality of integrally formed, spaced-apart, downwardly-depending, carpet-engaging members interlockably engageable with loop-pile fibers of a carpeted floor board. The mold includes a first die having a first surface and a second surface, and a plurality of spaced-apart apertures extending through the die from the first surface to the second surface. A second die has an outer surface positionable adjacent to the second surface. At least one of the second surface of the first die and the outer surface of the second die comprises at least one groove extending from and opening onto each of the plurality of apertures of the first die.

In yet another aspect of the present invention, a method is provided for forming a vehicle floor mat having a plurality of integrally formed, spaced-apart, downwardly-depending, carpet-engaging members interlockably engageable with loop-pile fibers of a carpeted floor board. The method includes the steps of providing a mold as noted above, providing a moldable elastomeric or rubber-like material, heating and contacting the moldable material to the first surface of the first die, forcing a portion of the moldable material into the spaced-apart apertures and into at least one of grooves in the outer surface of the second die or grooves in the second surface of the first die.

Desirably, the method further includes the steps of providing a carpet material and bonding the carpet material to a top surface of the moldable material.

Advantageously, the floor mat of the present invention is operable to securely attach to a loop-pile or combination loop-pile and cut-pile carpeted floor board to inhibit lateral motion of the floor mat relative to the carpeted floor board while allowing the floor mat to still be generally readily removed from the carpeted floor board. Desirably, the floor mat of the present invention, while interlockably engaging the loop-pile fibers of the carpeted floor board, does not damage the fibers when the floor mat is repeatedly removed, for example, for cleaning.

BRIEF DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following detailed description of the preferred embodiments and the accompanying drawings in which:

FIGS. 5–7 are enlarged cross-sectional views of alternative embodiments of carpet-engaging members according to the present invention;

FIG. 8 is a partial perspective view of a mold for forming the floor mat shown in FIG. 1;

FIG. 9 is a partial cross-sectional view of another embodiment for a mold for forming the floor mat shown in FIG. 1.

DETAILED DESCRIPTION OF THE INVENTION

Figure 1:
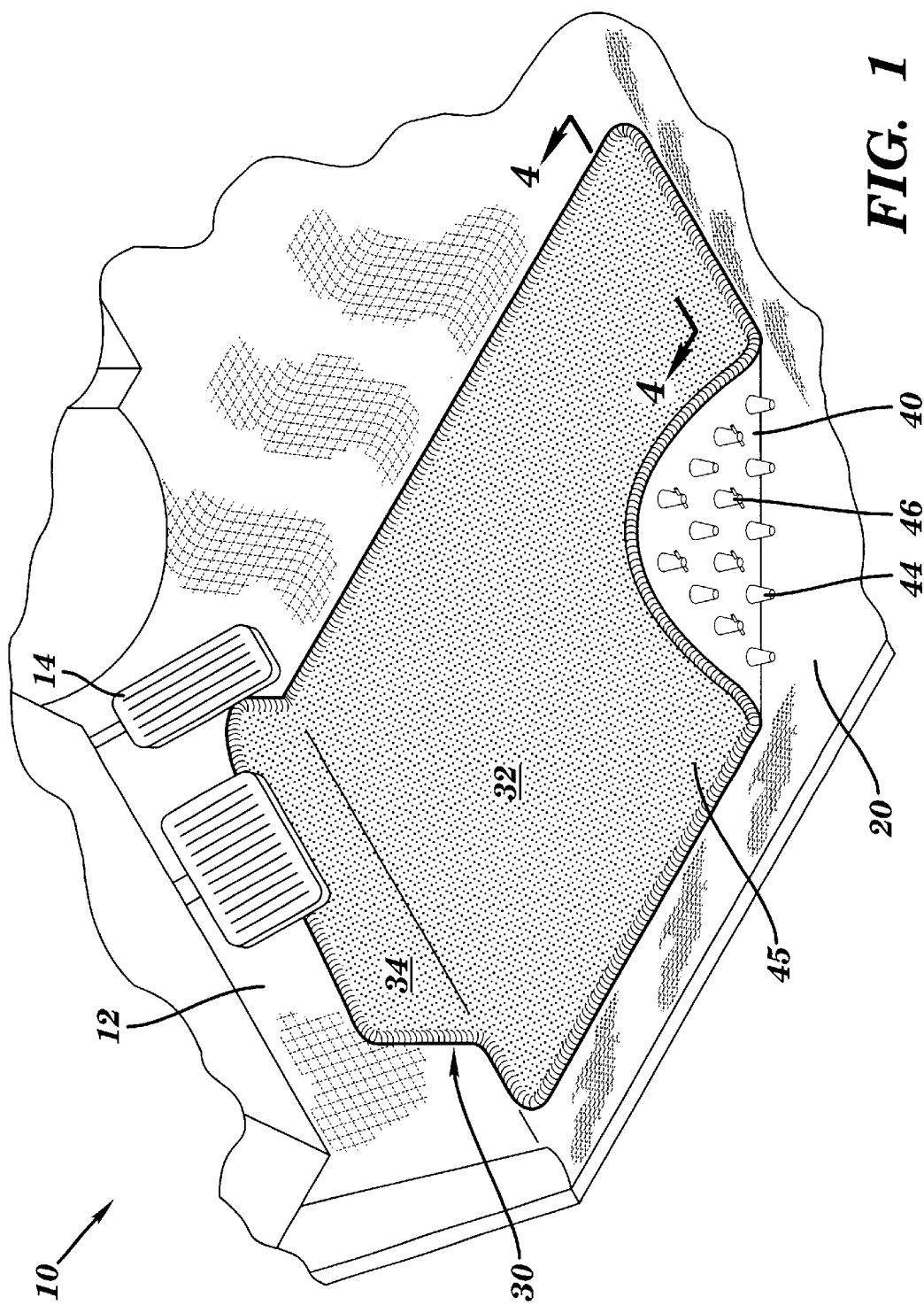
FIG. 1 is a top perspective view of one embodiment of a vehicle floor mat according to the present invention with one corner of the mat shown in a raised position.
Figure 2:
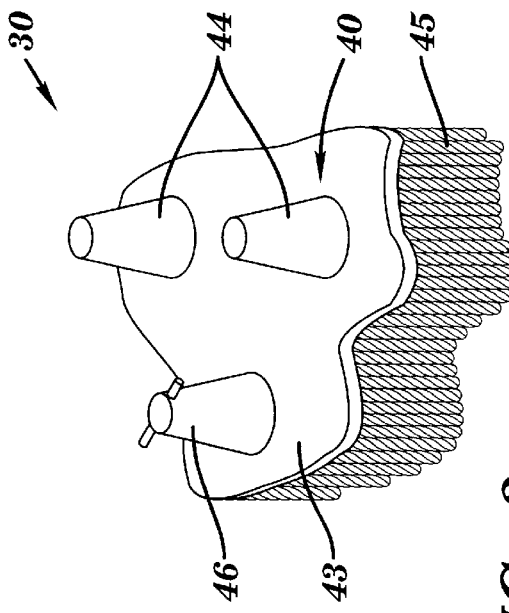
FIG. 2 is an enlarged, partial bottom view of the floor mat shown in FIG. 1.
Figure 3:
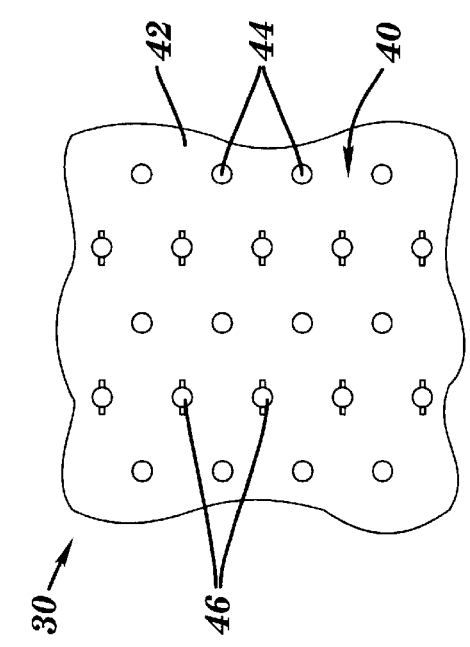
FIG. 3 is an enlarged, partial bottom perspective view of the floor mat shown in FIG. 1.

Referring now to the drawing figures, in which like elements are identified by like reference numbers, FIG. 1 depicts one embodiment of a vehicle floor mat 30 according to the present invention. Exemplary floor mat 30 is illustrated being disposed upon a carpeted floor board 20 of an automobile or other motor vehicle 10.

For the driver's side of a vehicle, floor mat 30 typically has a main body portion 32 designed to rest on the generally flat portion of carpeted floor board 20 and may have a front body portion 34 which overlies an inclined portion or front firewall 12. The shape of floor mat 30 desirably reflects the contours of carpeted floor board 20 and accommodates vehicle controls such as an accelerator pedal 14.

Floor mats for the passenger side of a vehicle or the foot area of the back seats are typically simpler in shape. The principles of the present invention are applicable to all such floor mats for use in loop-pile carpeted floor boards, as well as to mats designed to overlie loop-pile carpeted flooring in other floor areas such as in the trunk or cargo area of a vehicle. Although the present invention is directed to floor mats for use on loop-pile carpeted flooring, the floor mats of the present invention may also be used with combined loop-pile and cut-pile carpeted flooring.

With reference to FIGS. 1–4, floor mat 30 is releasably attachable to loop-pile fibers 22 (FIG. 4) of a carpet material 25 (FIG. 4) of carpeted floor board 20. In this exemplary embodiment, floor mat 30 includes a generally planar member 40 having a top surface 42, a carpet material 45 attached and/or bonded to top surface 42, a plurality of integrally formed, spaced-apart, downwardly-depending nibs 44, and a plurality of integrally formed, spaced-apart, downwardly-depending, carpet-engaging members 46 interlockably engageable with loop-pile fibers 22 of the carpeted floor board 20.

Exemplary nibs 44 may be tapered projections, preferably fruostoconically-shaped, and connected to a lower surface 43 of planar member 40. The nibs are intended to engage the underlying carpet and to prevent lateral floor mat movement. However, the nibs fail to catch or interlock with loop-pile fibers 22 of the carpeted floor board 20, i.e., there is no resistance to lifting the floor mat away from the carpeted floor board since there is no catching or interlocking of the nibs with the loop-pile fibers of the carpeted floor board. In addition, during lateral movement of floor mat 30 relative to carpeted board 20 there is no catching or interlocking of the nibs with the loop-pile fibers of the carpeted floor board.

Carpet material 25 of carpeted floor board 20 generally has a conventional construction having a support layer 27 with a plurality of loops tufted fibers or loop-pile fibers 22 therein and bound in place. The carpet can be constructed by use of weaving, knitting, tufting, or needle punching technologies. Yarns used to form the loops can be produced from a variety of materials including nylon, polyester, polypropylene, or a combination thereof, etc., and in any suitable denier. The loops can be napped or unnapped. Napped loops typically allow for greater carpet-engaging member engagement opportunities. The dispersion of the loops can be random or uniform, and preferably, multifilament yarns form the loops.

Desirably, the plurality of carpet-engaging members 46 is configured and fabricated from an elastic material so that the carpet-engaging members 46 are disengeable from loop-pile fibers 22 of carpeted floor board 20 generally without breaking or damaging loop-pile fibers 22 of carpeted floor board 20. For example, the planar member 40, and thus, integrally formed carpet-engaging members 46 are desirably formed from a heat formable/curable, elastomer or rubber-like material such as a thermoplastic elastomer, e.g., a thermoplastic olefin elastomer.

Desirably, planar member 40 comprises bottom surface 43 from which the plurality of carpet-engaging members 46 extend and are distributed over substantially the entire area or all of bottom surface 43 of floor mat 30. Advantageously, the plurality of carpet-engaging members 46 extends from and is generally equally distributed over substantially the entire area of bottom surface 12. Providing carpet-engaging members over substantially the entire area of the bottom surface of the floor mat ensures that the entire bottom surface is substantially fully engaged with the loop-pile carpeted floor board regardless of mat placement. Accordingly, the floor mat is always securely retained in place regardless of the care, or lack thereof, with which it is placed on the carpeted floor board. Skew, or lateral or longitudinal misalignment of the floor mat relative to the carpeted floor board does not adversely affect the retention power of the carpet-engaging members of the present invention.

The ratio of carpet-engaging members 46 to nibs 44 is illustrated in FIGS. 1–4 as being equal or fifty-fifty (i.e. alternating every row). The elasticity and/or resiliency of the carpet-engaging members, the configuration (e.g., size and shape) of the carpet-engaging members, and the spacing of the carpet-engaging members, are chosen for the floor mat according to the present invention so that the floor mat may be repeatedly removed for cleaning and reinstalled in the vehicle generally without damaging or breaking the loops of the carpeted floor board. Accordingly, the floor mat may have no nibs (i.e., solely downwardly-depending, carpet-engaging members therefrom) or a ratio of between about one to four carpet engaging members per every ten nibs. Other ratios and patterns thereof are also possible.

Figure 4:
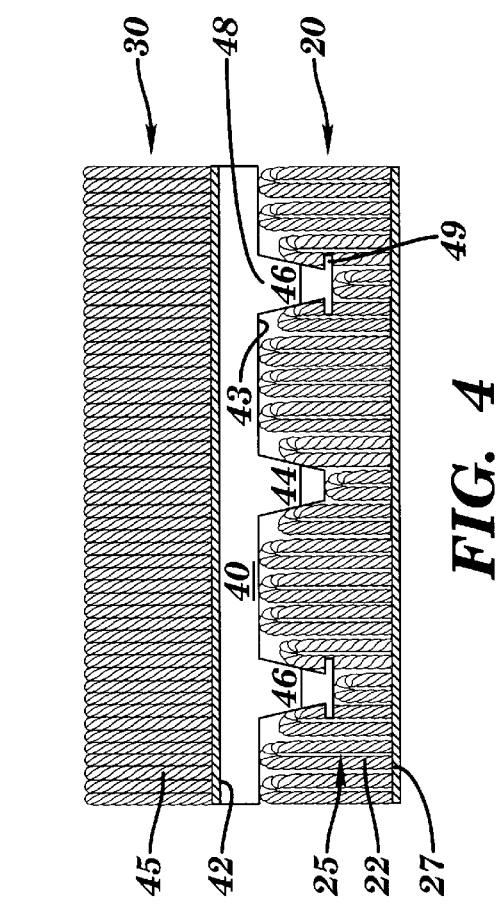
FIG. 4 is an enlarged cross-sectional view taken along line 4—4 of FIG. 1 illustrating the floor mat engaging the carpeted floor board.

As best shown in FIG. 4, each of the plurality of carpet-engaging members 46 includes a downwardly-depending projection 48, desirably fruostoconically-shaped, having a pair of outwardly-extending, generally elongated portions 49. Desirably, the pair of outwardly-extending portions 49 extend generally orthogonally from the axis of downwardly-depending projection 48.

The configuration of the carpet-engaging member may alternatively include a single outwardly-extending projection 52 as shown in FIG. 5, a single outwardly-extending projection 62 extending from a middle portion 64 between a bottom surface 63 of a planar member 60 and a bottom portion 67 of a downwardly-depending projection 66, as shown in FIG. 6, or outwardly-extending hook-shaped portion 72 as shown in FIG. 7.

From the present description, it will be appreciated by those skilled in the art that other configurations which engage or interlock with the loop-pile fibers would be equally suitable. In addition, the plurality of outwardly extending portions may be orientated in the same (e.g., unidirectional or aligned) or in different directions (e.g., multidirectional). The carpet engaging members may have a height on the order of about one-tenth to three-tenths inch (2.5 mm to 7.6 mm) and a spaced-apart distribution of about one-quarter to about one-inch (6.4 mm to 25.4 mm). The outwardly-extending portion may have a length extending from the side of the nib of about 0.16 inch (4 mm) or less.

The present invention is intended to enhance retention of a floor mat on an underlying carpeted surface to ensure substantial resistance to mat movement due to exertion of lateral forces (shear strength), while permitting somewhat relatively easy removal of the floor mat for cleaning and other purposes (peel strength), and generally not damaging or breaking the loop-pile fibers of the carpeted floor board.

FIG. 8 illustrates a mold 100 for forming vehicle floor mat 30 (FIG. 1) having a plurality of integrally formed, spaced-apart, downwardly-depending nibs 44 (FIG. 1), and carpet-engaging members 46 (FIG. 1) interlockably engageable with loop-pile fibers 22 (FIG. 4) of the carpeted floor board 20.

Exemplary mold 100 generally includes a first die 110 having a first surface 112 and a second surface 114, and a plurality of spaced-apart apertures 116 extending through first die 110 from first surface 112 to second surface 114. A second die 120 having an outer surface 122 is positionable adjacent to second surface 114 of first die 110.

Outer surface 122 of the second die 120 comprises a plurality of spaced-apart, parallel grooves 125 alignable with (i.e., registrable with) and extending from and opening onto each of the plurality of apertures 116. Grooves 125 may be continuous or discontinuous and in registration with some or all of aperture 116. First die 110 and second die 120 are illustrated as having a planar-shaped configuration.

In another embodiment, as shown in FIG. 9, a mold 102 includes a first die 130 having a first surface 132, a second surface 134, and a plurality of spaced-apart apertures 136 extending through first die 130 from first surface 132 to second surface 134. Second surface 134 also includes a plurality of spaced-apart grooves 135 extending from and opening onto each of apertures 136 of first die 130. Grooves 135 may be continuous or discontinuous and in registration with some or all of apertures 136. A second die 140 having a second surface 142 provides a backing for second surface 134.

Figure 10:
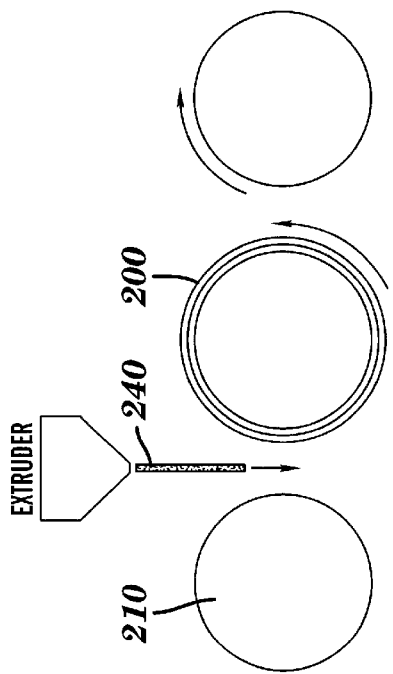
FIG. 10 is a side elevational view of an apparatus for forming the floor mat shown in FIG. 1.

Preferably, the first die and the second die have planar, curved-shaped configurations wherein they are readily suitable for use on a rotating drum 200 in conjunction with a pressure carrier roll 210 as shown in FIG. 10 for use in an automated, continuous extrusion production of floor mats.

A method for forming vehicle floor mat having a plurality of integrally formed, spaced-apart, downwardly-depending, carpet-engaging members interlockably engageable with loop-pile fibers of a carpeted floor board includes the step of providing, for example, a die 110 as described above. Next, a moldable material 240 (FIG. 10) such as a thermoplastic elastomer is provided and heated and contacted with first surface 112 of first member 110. A portion of the moldable material is forced into spaced-apart apertures 116 and partially into the plurality of grooves 125 in second surface 122 of second member 120. Desirably, the method further includes the steps of providing a carpet material and bonding the carpet material to a top surface of the moldable material.

Carpet material for the floor mat can be woven, knitted, tufted, needle punched or otherwise constructed and can be produced from any textile fiber, e.g., nylon, polyester, polypropylene, etc., and in any construction pattern, gauge, stitches/inch, etc. suitable for application in an automotive accessory floor mat.

Preferably, the carpet material and planar member forming material of the floor mat according to the present invention, and any peripheral trim and/or bonding agents are each comprised of a material from a common chemical family. The olefin family is preferred because of its low moisture retention and low specific gravity. A floor mat in which all components are comprised of either a material from a common chemical family, e.g., olefins, or inert materials, has the additional major advantage of being recyclable, for example, into feedstock for forming subsequent floor mats, without requiring separation of the components.

Thus, while various embodiments of the present invention have been illustrated and described, it will be appreciated by those skilled in the art that many changes and modifications may be made thereunto without departing from the spirit and scope of the invention.

What is claimed is:

1. A vehicle floor mat releasably attachable to loop-pile fibers of a carpeted floor board, said floor mat comprising:

a generally planar member having a plurality of integrally formed, spaced-apart, downwardly depending, carpet-engaging members interlockably engageable with the loop-pile fibers of the carpeted floor board, and a plurality of integrally formed spaced-apart, downwardly depending nibs.

2. The vehicle floor mat of claim 1 wherein said plurality of carpet-engaging members are configured and fabricated from an elastic material so that said plurality of carpet-engaging members provides resistance to movement between said floor mat and the carpeted floor board while being disengeable from the loop-pile fibers of the carpeted floor mat generally without breaking the loop-pile fibers of the carpeted floor mat.

3. The vehicle floor mat of claim 1 wherein said generally planar member and integrally-formed carpet-engaging members comprises a rubber-like material.

4. The vehicle floor mat of claim 3 wherein said generally planar member and integrally formed carpet-engaging members comprise a thermoplastic elastomer.

5. The vehicle floor mat of claim 1 wherein said generally planar member and integrally formed carpet-engaging members comprises a thermoplastic olefin elastomer.

6. The vehicle floor mat of claim 1 wherein said planar member comprises a bottom surface and said plurality of carpet-engaging members extend from and are distributed over substantially the entire area of said bottom surface.

7. The vehicle floor mat of claim 1 wherein said planar member comprises a bottom surface and said plurality of carpet-engaging members extend from and are generally evenly distributed over substantially the entire area of said bottom surface.

8. The vehicle floor mat of claim 1 wherein each of said plurality of carpet-engaging members comprises a downwardly-depending projection having at least one elongated outwardly-extending portion.

9. The vehicle floor mat of claim 8 wherein said at least one outwardly-extending portion comprises a pair of elongated outwardly-extending portions.

10. The vehicle floor mat of claim 8 wherein said at least one outwardly-extending portion extends generally orthogonally from said downwardly-depending projection.

11. The vehicle floor mat of claim 8 wherein said at least one outwardly-extending portion extends from a bottom portion of said downwardly-depending projection.

12. The vehicle floor mat of claim 8 wherein said at least one outwardly-extending projection extends from a portion of said downwardly-depending projection between said bottom surface of said planar member and a bottom portion of said downwardly-depending projection.

13. The vehicle floor mat of claim 1 wherein at least one of said plurality of carpet-engaging members has a hook-shaped configuration.

14. The vehicle floor mat of claim 1 wherein said planar member comprises a top surface and further comprising a carpet material attached to said top surface.

15. The vehicle floor mat of claim 1 wherein a ratio of carpet-engaging members to nibs is between about one to about four carpet engaging members per every ten nibs.

16. A vehicle floor mat releasably attachable to loop-pile fibers of a carpeted floor board, said floor mat comprising:

a generally planar member having a plurality of integrally formed, spaced-apart, downwardly depending nibs, and a plurality of integrally formed, spaced-apart downwardly depending, carpet-engaging members interlockably engageable with the loop-pile fibers of the carpeted floor board;

said plurality of nibs and said plurality of carpet-engaging members configured and fabricated from an elastic material so that said plurality of carpet-engaging members provide resistance to movement between said floor mat and the carpeted floor board while being disengageable from the loop-pile fibers of the carpeted floor board generally without breaking the loop-pile fibers of the carpeted floor mat; and a carpet material attached to a top surface of said planar member.

17. The vehicle floor mat of claim 16 wherein a ratio of carpet-engaging members to nibs is between about one to about four carpet engaging members per every ten nibs.

18. A floor mat comprising:

a generally planar member having a plurality of integrally formed, spaced-apart downwardly depending, carpet-engaging members; and wherein each of at least a portion of said plurality of carpet-engaging members comprises a downwardly-depending frustoconically shaped projection having at least one elongated outwardly-extending portion.

19. The floor mat of claim 18 wherein said at least one outwardly-extending portion comprises a pair of elongated outwardly-extending portions.

20. The floor mat of claim 18 wherein said at least one outwardly-extending portion extends generally orthogonally from said downwardly-depending projection.

21. The floor mat of claim 18 wherein said at least one outwardly-extending portion extends from a bottom portion of said downwardly-depending projection.

22. The floor mat of claim 18 wherein said at least one outwardly-extending projection extends from a portion of said downwardly-depending projection between said bottom surface of said planar member and a bottom portion of said downwardly-depending projection.

23. The floor mat of claim 18 wherein each of said portion of said plurality of carpet-engaging members has a hook-shaped configuration.

24. The floor mat of claim 18 wherein said generally planar member and integrally-formed carpet-engaging members comprise a rubber-like material.

25. The floor mat of claim 24 wherein said generally planar member and integrally formed carpet-engaging members comprise a thermoplastic elastomer.

26. The floor mat of claim 18 wherein said planar member comprises a bottom surface and said plurality of carpet-engaging members extend from and are distributed over substantially the entire area of said bottom surface.

27. The floor mat of claim 26 wherein said plurality of carpet-engaging members are generally evenly distributed over substantially the entire area of said bottom surface.

28. A carpet-engaging portion of a floor mat comprising:

a generally planar member having a top surface and a bottom surface;

a plurality of integrally formed, spaced-apart, downwardly depending, carpet-engaging members extending from said bottom surface, each of at least a portion of said plurality of carpet-engaging members comprising a downwardly-depending projection having at least one elongated outwardly-extending portion, said downwardly-depending projection having a frustum shape and said at least one outwardly-extending portion extending generally orthogonally from said downwardly-depending projection; and wherein said top surface is bonded to a backing of a carpet material.

29. The portion of the floor mat of claim 28 wherein said at least one outwardly-extending portion comprises a pair of elongated outwardly-extending portions.

30. The portion of the floor mat of claim 28 wherein said downwardly-depending projection has a frustoconical shape and said at least one outwardly-extending portion extends from a bottom portion of said downwardly-depending projection.

31. The portion of the floor mat of claim 28 wherein said at least one outwardly-extending projection extends from a portion of said downwardly-depending projection between said bottom surface of said planar member and a bottom portion of said downwardly-depending projection.

32. The portion of the floor mat of claim 28 wherein each of said portion of said plurality of carpet-engaging members has a hook-shaped configuration.

33. The portion of the floor mat of claim 28 wherein said generally planar member and integrally-formed carpet-engaging members comprise a rubber-like material.

34. The portion of the floor mat of claim 33 wherein said generally planar member and integrally formed carpet-engaging members comprise a thermoplastic elastomer.

35. The portion of the floor mat of claim 28 wherein said planar member comprises a bottom surface substantially coextensive with said floor mat and said plurality of carpet-engaging members extend from and are distributed over substantially the entire area of said bottom surface.

36. The portion of the floor mat of claim 35 wherein said plurality of carpet-engaging members are generally evenly distributed over substantially the entire area of said bottom surface.

37. A floor mat releasably attachable to loop-pile fibers of a carpet, said floor mat comprising:

a backing member substantially coextensive with said floor mat and having: a plurality of integrally formed, spaced-apart, downwardly depending, carpet-engaging members interlockably engageable with the loop-pile fibers of the carpet, and at least one integrally formed, downwardly-depending nib;

wherein said plurality of carpet-engaging members are configured and fabricated from an elastic material so that said plurality of carpet-engaging members provides resistance to movement between said floor mat and the carpet while being disengageable from the loop-pile fibers of the carpet generally without breaking the loop-pile fibers of the carpet; and carpet material bonded to a top surface of said backing member.

38. A surface covering releasably attachable to loop-pile fibers of an underlying substrate, said surface covering comprising:

a backing member having at least one integrally formed, downwardly depending nib, and at least one intentionally and integrally formed, downwardly depending, substrate-engaging member interlockably engageable with the loop-pile fibers of the substrate.

39. The surface covering of claim 38 further comprising a carpet material bonded to a top surface of said backing member.

\* \* \* \* \*